(12) United States Patent
Wong et al.

(10) Patent No.: US 10,769,632 B2
(45) Date of Patent: *Sep. 8, 2020

(54) MULTI-COMMERCE CHANNEL WALLET FOR AUTHENTICATED TRANSACTIONS

(71) Applicant: MASTERCARD INTERNATIONAL INCORPORATED, Purchase, NY (US)

(72) Inventors: Shoon Ping Wong, Stamford, CT (US); Kenneth Chung Lem Moy, Westport, CT (US); Celine Martig, Singapore (SG); Pablo Fourez, White Plains, NY (US); Alan Mushing, Wincham (GB); Fredrik Lundequist, Brussels (BE); Michael Ameiss, Wentzville, MO (US); Michael Shaon, Columbia, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 480 days.

This patent is subject to a terminal disclaimer.

(21) Appl. No.: 15/481,114

(22) Filed: Apr. 6, 2017

(65) Prior Publication Data

US 2017/0243219 A1    Aug. 24, 2017

Related U.S. Application Data

(62) Division of application No. 13/209,312, filed on Aug. 12, 2011, now abandoned.

(Continued)

(51) Int. Cl.
*G06Q 20/40* (2012.01)
*G06Q 20/36* (2012.01)
(Continued)

(52) U.S. Cl.
CPC ....... *G06Q 20/4014* (2013.01); *G06Q 20/105* (2013.01); *G06Q 20/227* (2013.01);
(Continued)

(58) Field of Classification Search
CPC .......... G06Q 20/3674; G06Q 20/4014; G06Q 20/105; G06Q 20/227; G06Q 20/3223;
(Continued)

(56) References Cited

U.S. PATENT DOCUMENTS 5,696,909 A    12/1997 Wallner
7,039,611 B2    5/2006 Devine
(Continued)

FOREIGN PATENT DOCUMENTS

KR    10-2005-0045157 A    5/2005
KR    10-2009-0012897 A    2/2009
(Continued)

OTHER PUBLICATIONS

International Search Report and Written Opinion dated Feb. 28, 2012.

*Primary Examiner* — Steven S Kim
(74) *Attorney, Agent, or Firm* — Budzyn IP Law, LLC

(57) ABSTRACT

A phone-based electronic wallet providing authenticated transactions across multiple channels of commerce. The electronic wallet may be used for point-of-sale payments, remote mobile payments and/or web-based payments, and may use authentication tools such as offline PINs, SecureCode PINs and/or online PINs.

3 Claims, 11 Drawing Sheets

Related U.S. Application Data

(60) Provisional application No. 61/468,847, filed on Mar. 29, 2011, provisional application No. 61/372,955, filed on Aug. 12, 2010.

(51) Int. Cl.
*G06Q 20/10* (2012.01)
*G06Q 20/22* (2012.01)
*G06Q 20/32* (2012.01)
*G06Q 20/34* (2012.01)
*H04L 29/06* (2006.01)

(52) U.S. Cl.
CPC ....... *G06Q 20/3223* (2013.01); *G06Q 20/351* (2013.01); *G06Q 20/36* (2013.01); *G06Q 20/363* (2013.01); *G06Q 20/367* (2013.01); *G06Q 20/3674* (2013.01); *G06Q 20/40* (2013.01); *G06Q 20/401* (2013.01); *G06Q 20/4012* (2013.01); *H04L 63/10* (2013.01)

(58) Field of Classification Search
CPC .... G06Q 20/351; G06Q 20/36; G06Q 20/363; G06Q 20/367; G06Q 20/40; G06Q 20/401; G06Q 20/4012; H04L 63/10
See application file for complete search history.

(56) References Cited

U.S. PATENT DOCUMENTS

| | | | |
|---|---|---|---|
| 7,051,002 B2 | 5/2006 | Keresman, III et al. | |
| 7,111,789 B2 | 9/2006 | Rajasekaran et al. | |
| 7,653,602 B2 | 1/2010 | Davis | |
| 7,693,783 B2 | 4/2010 | Balasubramanian et al. | |
| 7,707,113 B1 | 4/2010 | DiMartino et al. | |
| 7,707,120 B2 | 4/2010 | Dominguez et al. | |
| 7,720,783 B2 | 5/2010 | Staddon et al. | |
| 7,761,380 B2 | 7/2010 | Katz | |
| 7,827,115 B2 | 11/2010 | Weller et al. | |
| 7,870,219 B2 | 1/2011 | McCormack et al. | |
| 7,885,870 B2 | 2/2011 | Nam et al. | |
| 7,904,360 B2 | 3/2011 | Evans | |
| 8,468,545 B2 | 6/2013 | Townsend et al. | |
| 8,527,417 B2 * | 9/2013 | Telle | G06Q 20/385 705/35 |
| 9,160,741 B2 * | 10/2015 | Wentker | G06F 21/33 |
| 2002/0111919 A1 * | 8/2002 | Weller | G06Q 20/02 705/67 |
| 2002/0179704 A1 * | 12/2002 | Deaton | G06Q 20/04 235/383 |
| 2002/0194138 A1 | 12/2002 | Dominguez et al. | |
| 2003/0195963 A1 | 10/2003 | Song et al. | |
| 2003/0200184 A1 | 10/2003 | Dominguez et al. | |
| 2004/0210536 A1 | 10/2004 | Gudelj et al. | |
| 2004/0243514 A1 | 12/2004 | Wankmueller | |
| 2004/0243520 A1 | 12/2004 | Bishop et al. | |
| 2005/0176424 A1 | 8/2005 | Kumar et al. | |
| 2005/0222961 A1 | 10/2005 | Staib et al. | |
| 2005/0246278 A1 | 11/2005 | Gerber et al. | |
| 2005/0246649 A1 * | 11/2005 | Wilhelm | G06F 16/41 715/762 |
| 2005/0289052 A1 * | 12/2005 | Wankmueller | G06Q 20/102 705/40 |
| 2006/0282382 A1 | 12/2006 | Balasubramanian et al. | |
| 2007/0143227 A1 | 6/2007 | Kranzley et al. | |
| 2007/0295803 A1 | 12/2007 | Levine et al. | |
| 2008/0120214 A1 * | 5/2008 | Steele | G06Q 20/341 705/35 |
| 2008/0154770 A1 | 6/2008 | Rutherford et al. | |
| 2008/0189186 A1 | 8/2008 | Choi et al. | |
| 2009/0037982 A1 | 2/2009 | Wentker et al. | |
| 2009/0150262 A1 | 6/2009 | Mizhen | |
| 2009/0216840 A1 * | 8/2009 | Pajunen | G06F 16/9577 709/206 |
| 2009/0234751 A1 * | 9/2009 | Chan | G06Q 20/145 705/26.1 |
| 2009/0240594 A1 | 9/2009 | Kemer et al. | |
| 2009/0325542 A1 | 12/2009 | Wentker et al. | |
| 2010/0057619 A1 | 3/2010 | Weller et al. | |
| 2010/0057934 A1 | 3/2010 | Ratica | |
| 2010/0063895 A1 | 3/2010 | Dominguez et al. | |
| 2010/0082486 A1 | 4/2010 | Lee | |
| 2010/0114740 A1 | 5/2010 | Dominguez et al. | |
| 2010/0153272 A1 | 6/2010 | Wentker et al. | |
| 2010/0169215 A1 | 7/2010 | Balasubramanian et al. | |
| 2010/0243728 A1 | 9/2010 | Wiesman et al. | |
| 2010/0268648 A1 | 10/2010 | Wiesman et al. | |
| 2010/0312703 A1 | 12/2010 | Kulpati et al. | |
| 2010/0332393 A1 | 12/2010 | Weller et al. | |
| 2011/0029437 A1 * | 2/2011 | Lee | G06Q 20/32 705/72 |
| 2011/0119155 A1 * | 5/2011 | Hammad | G06F 21/34 705/26.41 |
| 2012/0011065 A1 * | 1/2012 | Winfield-Chislett | G06Q 20/02 705/42 |

FOREIGN PATENT DOCUMENTS

| | | |
|---|---|---|
| KR | 10-2010-0084068 A | 7/2010 |
| WO | 2008-005018 A2 | 1/2008 |

* cited by examiner

PRIOR ART

Existing 3D Secure Implementation   FIG. 6

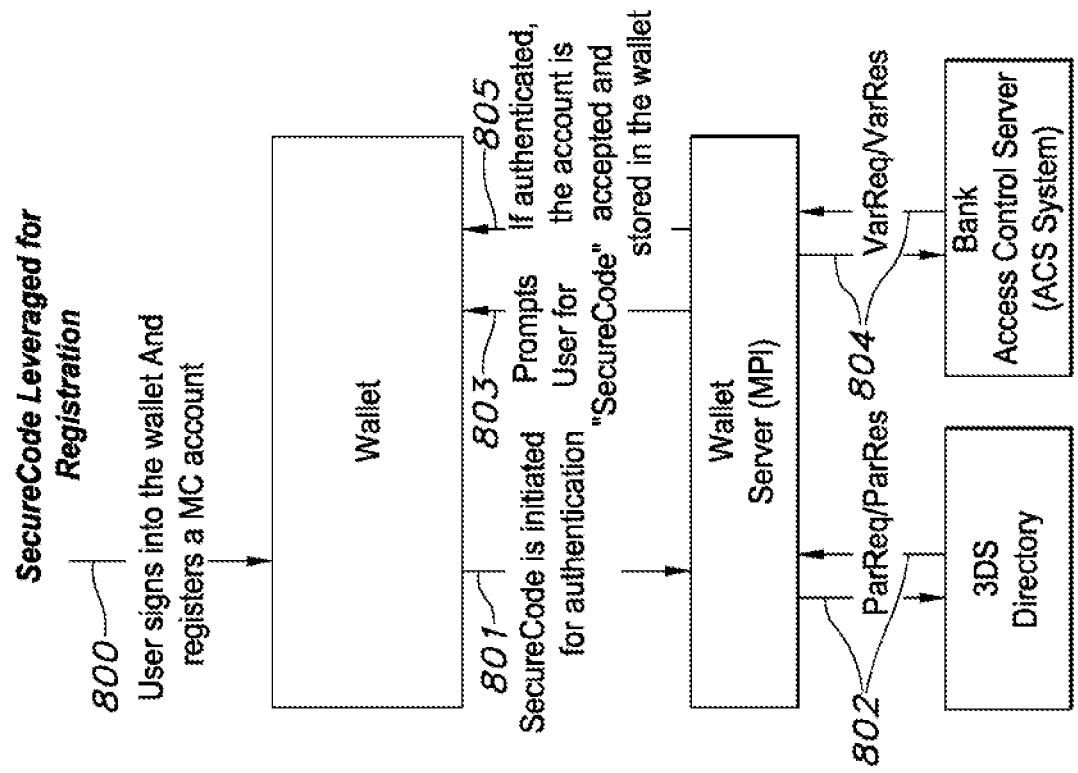

MULTI-COMMERCE CHANNEL WALLET FOR AUTHENTICATED TRANSACTIONS

This application is a divisional of U.S. patent application Ser. No. 13/209,312, filed on Aug. 12, 2011, now pending, which claims the benefit of U.S. Provisional Application Ser. No. 61/486,847, filed Mar. 29, 2011 and U.S. Provisional Application Ser. No. 61/372,955, filed on Aug. 12, 2010, the disclosures of which are hereby incorporated by reference in their entirety.

BACKGROUND OF THE INVENTION

The present invention relates to transactions for payments of goods/services and, more particularly, to a phone-based electronic wallet providing authentication of transactions across multiple channels of commerce.

Both credit cards and debit cards are commonly used in the retail environment for the purchase of goods and/or services. Such cards are popular with consumers, and merchants accept these cards as a necessary part of doing business, i.e., they provide an effective substitute to cash and checks.

These card-based transactions are typically performed across multiple channels of commerce. For example, card-based transactions may be performed in person at a retail outlet, via a computer connected to the internet, via a mobile phone and/or via a company-based call center (e.g., a 1-800 number for a catalog company). These various transactions are conducted in different ways and, accordingly, have different levels of fraud risk associated therewith. In addition, the mentioned transactions generally require that the consumer have his or her card in hand to either present to the cashier in a retail environment, or to enter the requested information via the internet and/or over the telephone. Those knowledgeable in the field with recognize that the risk of financial fraud is greater during remote transactions because there is less ability for the merchant to verify the identity and authenticity of the cardholder.

It will also be appreciated that in today's environment it is common for a consumer to carry his or her cell/mobile phone on their person at all times. In fact, on many occasions it is more likely that the consumer will be carrying his/her phone, than carrying his/her wallet. Companies have attempted to tap into this trend by offering/facilitating various phone-based applications directed to a whole range of services. The recent growth of so-called "smart phones" has greatly increased the interest of companies in this area. As a result, more and more transactions are likely to be performed from a remote location, e.g., ordering a product over the internet while standing in line. However, as the number of remote transactions increase, so does the risk of financial fraud.

There is therefore a need in the art for a method and system for authenticating electronic transactions across multiple channels of commerce. There is a further need in the art for a method and system which operates in conjunction with a phone (e.g., a smart phone) for authenticating financial transactions whether initiated in person, over the internet via a stand alone terminal, via the placement of a call to the call center of a company, and/or via a transaction initiated with the very same phone. Finally, there is a need in the art for a method and system which allows a bank or other financial institution to reduce fees to merchants conducting remote electronic transactions when utilizing enhanced authentication techniques, and to limit/reverse the shifting of fraud liability to the merchant for such remote transactions.

SUMMARY OF THE INVENTION

The present invention provides a mobile-phone centric electronic wallet providing the security of a virtual card terminal for online and off-line purchases. A wallet server (e.g., an application running in a cloud) and synchronized companion mobile and computer interface enables consumers to make purchases (which can include: retail, e-commerce, mobile, call center, etc) and use the mobile phone to authenticate against one of the authentication techniques tied to the chosen card (which can include: an offline PIN utilizing a secure memory chip, a MasterCard SecureCode PIN, and/or an online PIN such as an ATM PIN) where the necessary transaction and card specific authentication and processing method is directed by a central directory. The authentication process of the present invention allows participating banks to deem such transactions as more fully authenticated, which will allow them to lower the costs charged to merchants. The authentication process of the present invention will also limit/reverse the shifting of liability to the merchant since these more fully authenticated transactions will have less fraud associated therewith.

This system with its various authentication mechanisms will preferably utilize a central, hosted directory, which, when queried by the wallet application during a transaction, will instruct the wallet how the transaction needs to be authenticated and processed, depending on the card used and type of transaction. In all instances, the authentication result and authentication method will be communicated from the wallet to the merchant via specific transaction codes and/or transaction tokens that will further enable proper risk scoring, authorization processing, and enforcement of specific scheme rules and terms and conditions (e.g. pricing, rules, liability shift, etc.) by the merchant acquirer. The wallet facilitates authentication from multi-commerce channels and will leverage multi-band communication to facilitate transaction authentication.

For retail (Point-of-sale (POS)/Face-to-Face (F2F)) purchase transactions, the consumer may use the PayPass contactless capabilities which may be a feature of a chip located in the phone. For higher transaction value amounts where a PIN may be required, the wallet will prompt the user for the PIN on the phone. Successful authentication will be communicated from the wallet to the merchants or its Acquirer directly for approval processing.

For some remote (e-commerce, mobile or call center) purchase transactions, the consumer will employ his/her mobile phone and the wallet capabilities as a virtual POS terminal. In this case, when the consumer makes a purchase (e.g., through a computer or the mobile phone itself), the wallet will prompt the user for the PIN on the phone and enable a secure verification of the PIN value entered by the user, either in a pure offline mode, against the algorithm associated with the secure element on the phone, using for example the EMV protocol, or in an online mode, by encrypting the PIN and transmitting it. Successful authentication will be communicated from the wallet to the merchant's checkout system to be relayed to the Acquirer for approval processing.

For other remote (e-commerce, mobile or call center) purchase transactions, this invention builds on the pre-existing MasterCard SecureCode (MSC) system. It is contemplated herein that the SecureCode protocol can be extended to include a novel SecureCode wallet Application Programming Interface (API), to enable a MSC validation within the wallet interface through the wallet API, instead of through an internet browser session/window to communicate with the bank's authentication server. To facilitate this, the mobile phone will prompt the user for entry of the MSC password or PIN within the wallet-driven interface on the phone and communicate securely with the ACS (the bank's MSC authentication server). Successful authentication will be communicated from the wallet to the merchant's checkout system to be relayed to the Acquirer for approval. This last step preferably replaces the pre-existing MSC Merchant software, thus reducing the implementation requirements for the merchant. Finally, this interface will preferably allow setup and reset of a MSC password or PIN, again without the need to use a separate browser window or session with the bank's authentication server.

Thus, the system and method of the present invention provide an electronic wallet for authenticating transactions across multiple channels of commerce using the consumer's own mobile phone. The present invention provides better economics for merchants through lower fee structures, and limits/reduces the shifting of fraud liability to the merchant for remote transactions. The present invention is scalable in design to provide easy integration for merchants, and to avoid issuer by issuer sales and implementations. It is also easy to deploy directly to customers. Finally, the present invention will promote profitability by driving transaction volumes and revenues.

BRIEF DESCRIPTION OF THE DRAWINGS

FIG. 9a is a flow chart showing the process of authenticating the wallet application using a SecureCode process;

DETAILED DESCRIPTION OF THE INVENTION

Figure 1:
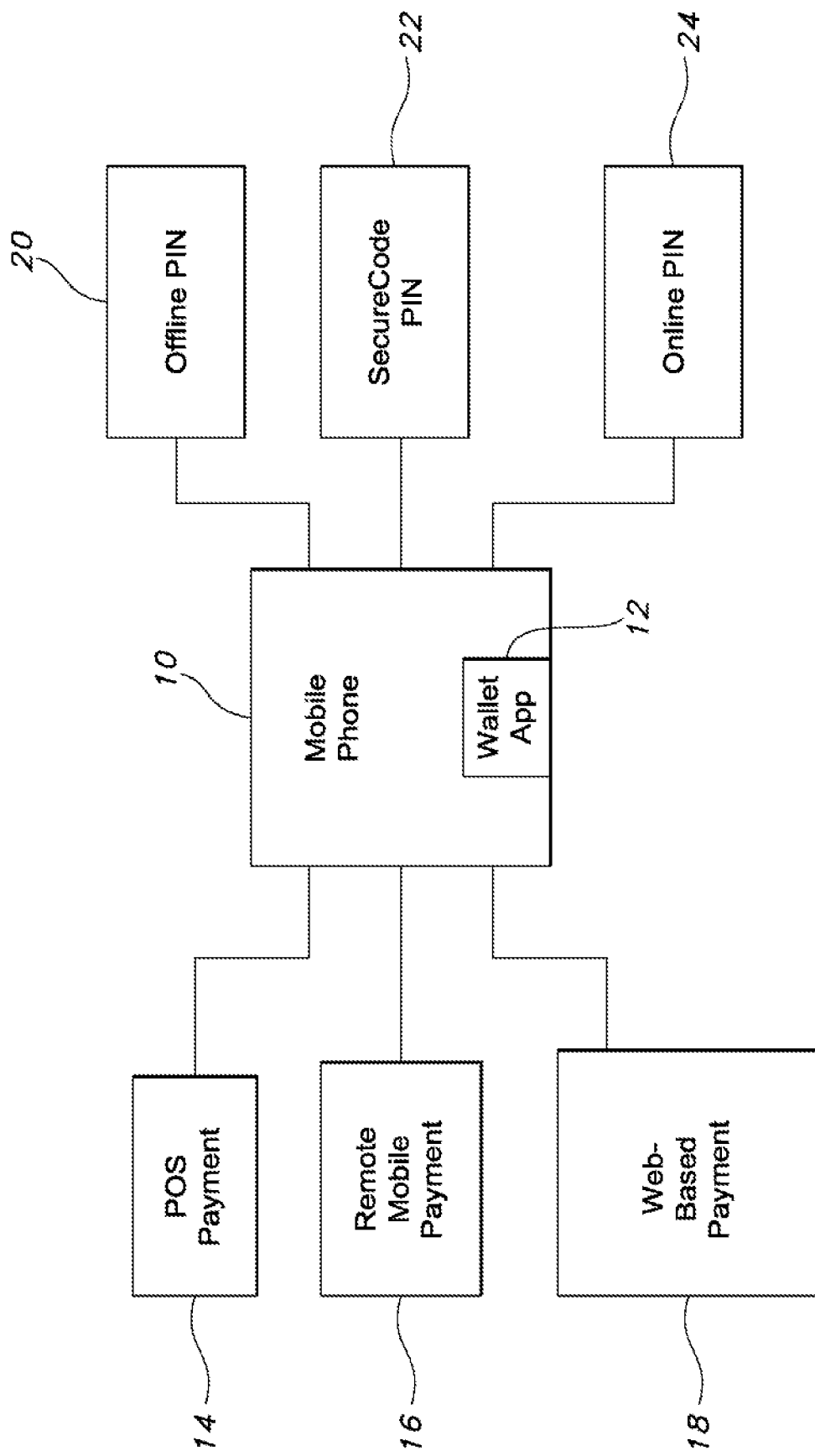
FIG. 1 is a schematical representation of a mobile phone-based payment/authentication system.

Referring now to FIG. 1, the present invention is centered around a mobile phone 10 associated with a payment card, e.g., a credit card, debit card or prepaid card. The mobile phone is preferably capable of storing and/or running a wallet application 12, which is preferably a browser-based mobile application capable of storing selected information such as a cardholder name, card alias, billing/shipping address, etc., locally on the phone or in a cloud server. In one preferred embodiment, the mobile phone is a "smart phone", and the wallet application is stored in a memory device located in the phone. It is contemplated herein that the system and method of the present invention will enable payments across multiple channels of commerce, e.g., a POS payment 14 by, for example, a PayPass terminal, a remote mobile payment 16 initiated by a mobile phone, and/or a web-based payment 18.

As further described in FIG. 1, the present invention contemplates the use of various authentication tools including an offline PIN 20, a SecureCode PIN 22, and/or an online PIN 24. It will be recognized that the foregoing mentioned PINs are currently in use in the marketplace and, accordingly, the use of such already existing PINs can facilitate the implementation of the present system. Of course, it is contemplated herein that a new independent PIN (apart from the mentioned PINs) can be created specifically for use with the present invention.

Offline PIN 20 preferably utilizes an offline PIN verification process whereby the PIN entered by the consumer is verified by a secure element located on phone 10. In this process, the wallet plays the role of a "virtual terminal", interacting with the secure element, and upon verification of the PIN, passes the CHIP token (ARQC) to the merchant for authorization. In this "virtual terminal", the secure element serves the role as the "card". Offline PIN 20 can, for example, be used in connection with a PayPass payment.

Secure Code PIN 22 is a PIN associated with a card enrolled in the MasterCard SecureCode system. It is contemplated herein that the SecureCode system could also utilize a password and/or code, rather than a PIN.

Online PIN 24 is used in an online PIN verification process whereby the wallet application 12 plays the role of a "virtual terminal", interacting to encrypt the PIN for transmission to the merchant. The use of an online PIN verification process may provide greater flexibility in authenticating transactions by, for example, allowing an issuing bank to authenticate the transactions associated with its cardholders without the need for the issuing bank to enroll/register its cardholders and/or adopt new infrastructure.

Users may have different instances of wallet application 12 on different phones. A sync service can maintain the various instances synchronized with an online server (similar to how browser bookmarks can be stored offline in different instances of an internet browser and be synchronized between various machines.) Merchants can add a piece of code to their checkout button that invokes the wallet application. During checkout, users select card and shipping address (if needed). The authentication PIN is entered into the phone in response to a prompt from the mobile application. The wallet passes back the information to the merchant who submits this information through existing channels (internet gateway or payment processor), i.e., no changes are required to existing processes or integration.

In one preferred embodiment, the wallet application may be a browser HTML 5 application (not a native application) that self-installs in the mobile phone or computer browser on the first use.

In another preferred embodiment, the wallet application can securely store information on the phone (shipping address, card alias, secure token, etc.). This information can be used to authenticate to the remote server. This also enables offline transactions. The mobile application can preferably "talk" to the secure element on the phone. In this regard, the mobile application could play the role of a virtual POS terminal in initiating card present CHIP plus PIN transactions.

In accordance with the present invention, a consumer may use his phone or computer to shop at a web-based retailer. When the consumer is ready to check out, he will preferably have the option of clicking a checkout button associated with the present system. Clicking the button prompts the consumer to provide his username and password to log-in, and to confirm both the payment card to be used and the shipping address to which the item is to be sent. Thereafter, the system will prompt the consumer to enter the authenticating PIN, and the transaction is then completed. At that point, the consumer is preferably returned to the merchant's site.

The present invention provides several benefits to the consumer. More particularly, the present invention provides easy and convenient checkout through a form fill or pass through function, which is preferably part of the wallet application. The present invention offers secure payments via a PIN, or other biometric parameters such as a voice print or fingerprint. In this regard, the smart phone may be provided with a biometric reader and/or analyzer.

The present invention also provides benefits to the merchant including a potential liability shift from the merchant to the authorizing bank for all wallet-based transactions. More particularly, the use of an authentication process for remote transactions reduce the risk of fraud associated with such transactions, and may limit/reverse the shifting of fraud liability from the authorizing bank to the merchant. The use of the authentication process described herein may also provide more attractive economics to the merchant through access to lower fee structures, depending on the consumer authentication method. The present invention also provides limited integration impact in that it provides a simple wallet API to pass card details, shipping information and security tokens, and does not require any new contractual relationships (i.e., it leverages existing card acceptance). Finally, the present invention is backwards compatible, (i.e., it provides native support for SecureCode) thus resulting in better consumer experience/ergonomics.

The wallet application of the present invention provides a comprehensive solution to financial transactions conducted across multiple channels of commerce. The present wallet application provides a simple and winning proposition to consumers, and provides a form fill option in an innovative application. The present invention can use existing payment networks (e.g., Mastercard worldwide system) which are already accepted by merchants, thereby eliminating the need for heavy integration, while providing more security and better economics. The present invention does not require issuing banks to implement new requirements since the system can function with existing authorization techniques, e.g., SecureCode, CHIP and PIN and/or online PIN. The present invention also contemplates the long term convergence path of the three commerce platforms—retail, e-commerce and mobile—towards a mobile phone centric system. The present invention also provides the potential to deliver incremental top line revenue growth by 1) protection of transaction volumes and revenues; 2) by providing an innovative and proprietary approach with the option to price different services to issuers, merchants or partners (e.g., directory service, wallet service, etc.); and 3) by providing flexibility for later expansion (new funding source, secure elements, etc.).

It is also contemplated that the authentication processes described herein can be used in applications where the consumer owns a "dumb phone". For example, in applications where the consumer is conducting an e-commerce transaction through his computer, or has initiated a call to a call center, and the consumer does not own a smart phone, the present system can utilize existing SMS messaging or other messaging technology to contact the "dumb phone" of the consumer and request the entry of a PIN. Upon receipt of the PIN from the "dumb phone", the transaction can be authenticated and completed.

Figure 2:
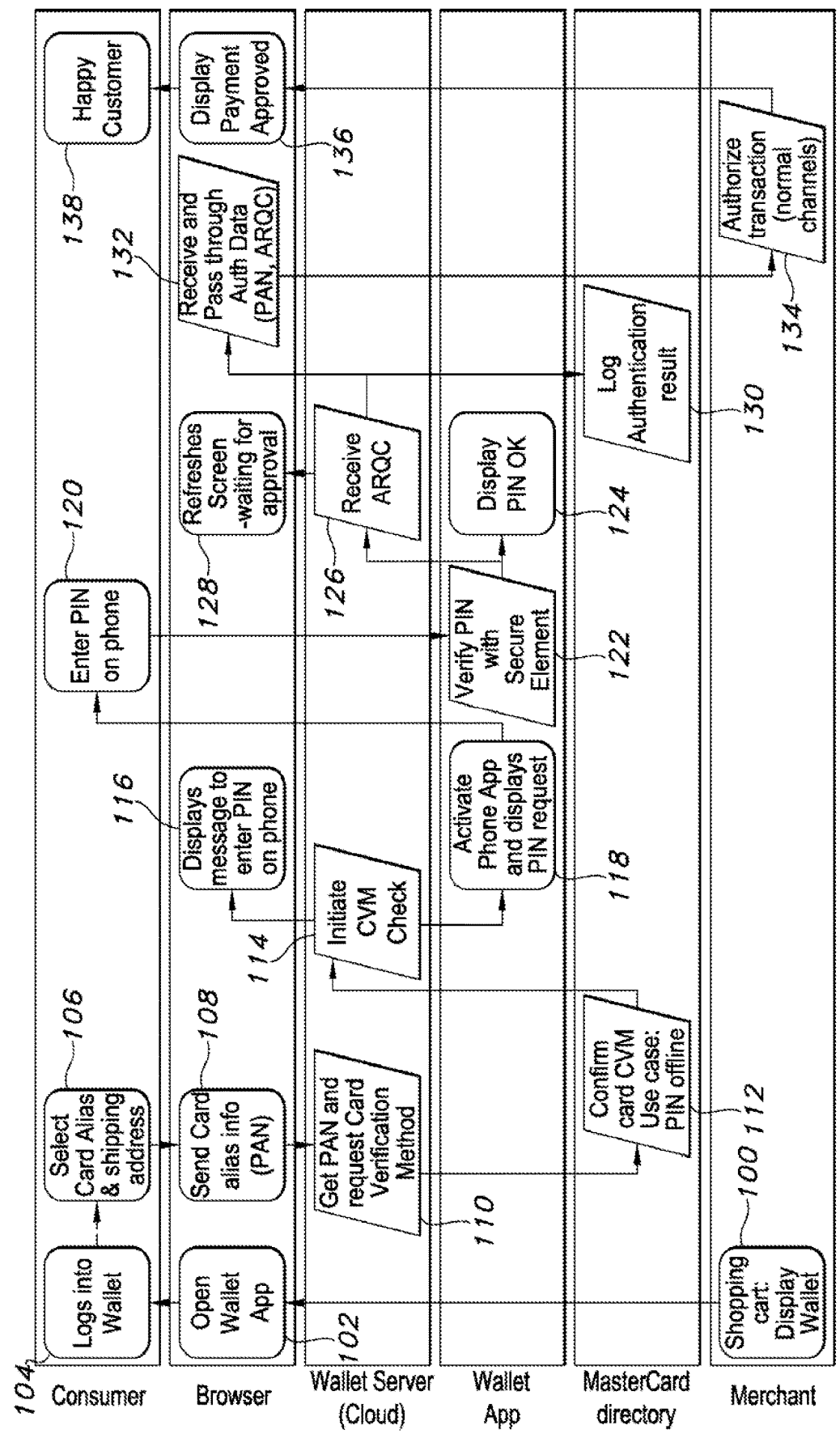
FIG. 2 is a flow chart depicting the wallet application of the present invention being used in an e-commerce transaction originating via a computer, the wallet application cooperating with a secure element on the phone and an offline PIN.

FIG. 2 is a flow chart depicting the wallet application of the present invention being used in an e-commerce transaction (e.g., a computer-initiated transaction) with a secure element and an offline PIN. In step 100, the consumer selects the "wallet" icon on the merchant's site. The wallet application is then opened at step 102 by the browser on the user's computer. The consumer then logs into the wallet application (step 104), The appropriate payment card and shipping details are selected (step 106), and the card's PAN is then sent to the wallet server (step 108). In step 110, the wallet server requests the Card Verification Method (CVM) from the MasterCard directory. This directory may be based on an expanded version of the currently existing SecureCode directory, or may be an entirely new directory. The appropriate CVM is confirmed at step 112. The wallet server then initiates the CVM check (step 114). A message to enter the PIN is then displayed on the browser (step 116) and on the mobile phone (step 118). The consumer then enters the offline PIN into the mobile phone in step 120. In step 122, the offline PIN is verified by the secure element on the phone. An "OK" message is displayed on the phone (step 124), and the ARQC is transmitted to the wallet server (step 126). The browser is refreshed (step 128), the authentication result is transmitted to the MasterCard directory (step 130), and the authorization data is transmitted to the browser (step 132). The transaction is then authorized by the merchant at step 134, and the approval is displayed at step 136, resulting in a happy consumer (step 138).

Figure 3:
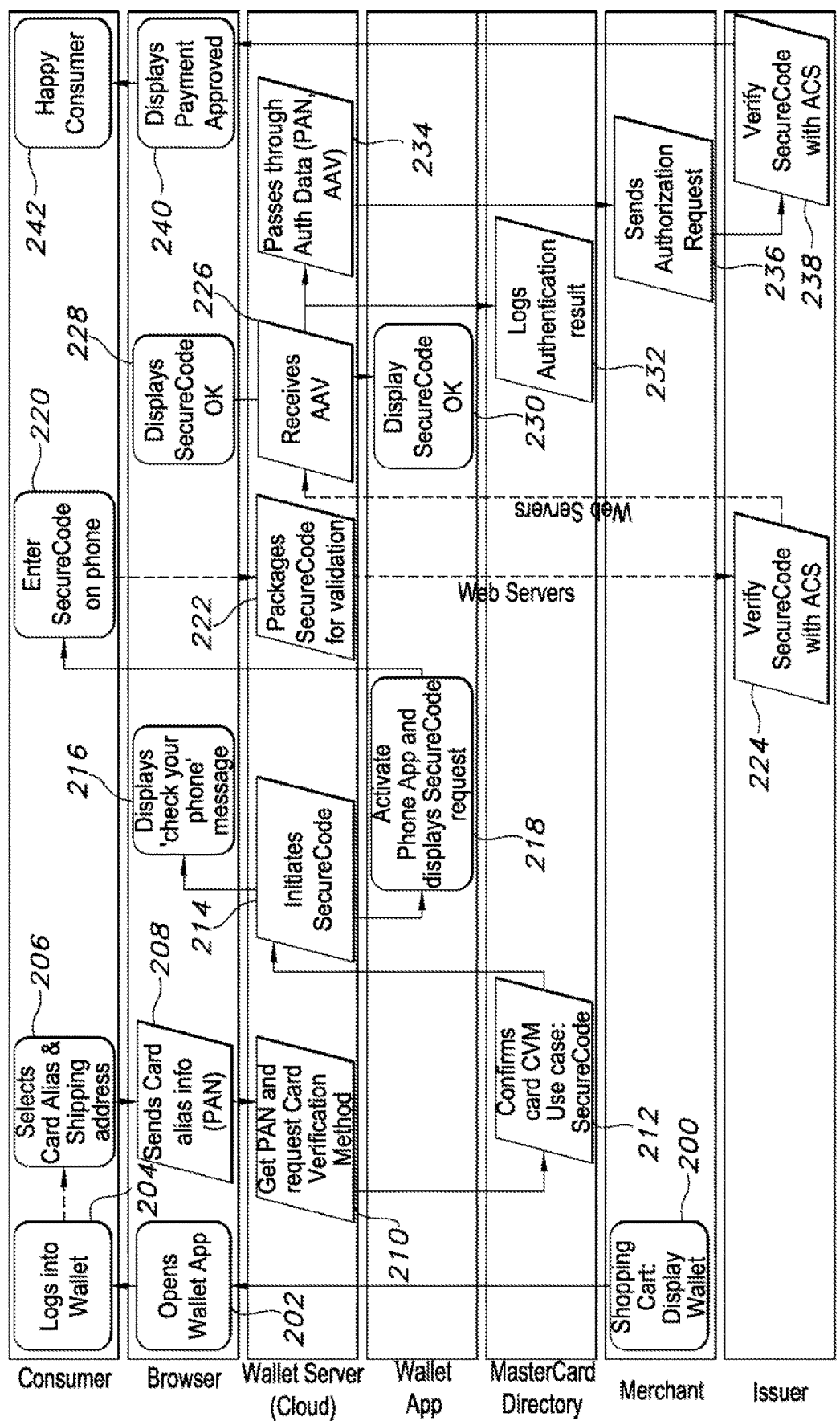
FIG. 3 is a flow chart depicting the wallet application of the present invention being used in an e-commerce transaction originating via computer, the wallet application cooperating with a SecureCode PIN for authentication.

FIG. 3 is a flow chart depicting the wallet application of the present invention being used in an e-commerce transaction (e.g., a computer-initiated transaction) with a SecureCode PIN. In step 200, the consumer selects the "wallet" icon on the merchant's site. The wallet application is then opened at step 202 by the browser on the user's computer. The consumer then logs into the wallet application (step 204). The appropriate payment card and shipping details are selected (step 206), and the card's PAN is then sent to the wallet server (step 208). In step 210, the wallet server requests the Card Verification Method (CVM) from the MasterCard directory. This directory may be based on an expanded version of the currently existing SecureCode directory, or may be an entirely new directory. The appropriate CVM is confirmed at step 212. The wallet server then initiates the SecureCode authentication process (step 214). A "check phone" message is then displayed on the browser of the computer (step 216) and a message to enter the SecureCode PIN is displayed on the mobile phone (step 218). The consumer then enters the SecureCode PIN into the mobile phone in step 220. In step 222, the wallet server packages the SecureCode for validation. The SecureCode is then verified at step 224. This verification process will be discussed in greater detail hereinbelow. Once verified, an AAV is sent to the wallet server (step 226). An "OK" message is displayed on the browser (step 228) and on the phone (step 230). The authentication result is transmitted to the MasterCard directory (step 232), and the authorization data (step 234) is transmitted to the merchant for authorization (step 236). The transaction is then authorized at step 238, and the approval is displayed at step 240, resulting in a happy consumer (step 242).

Figure 4:
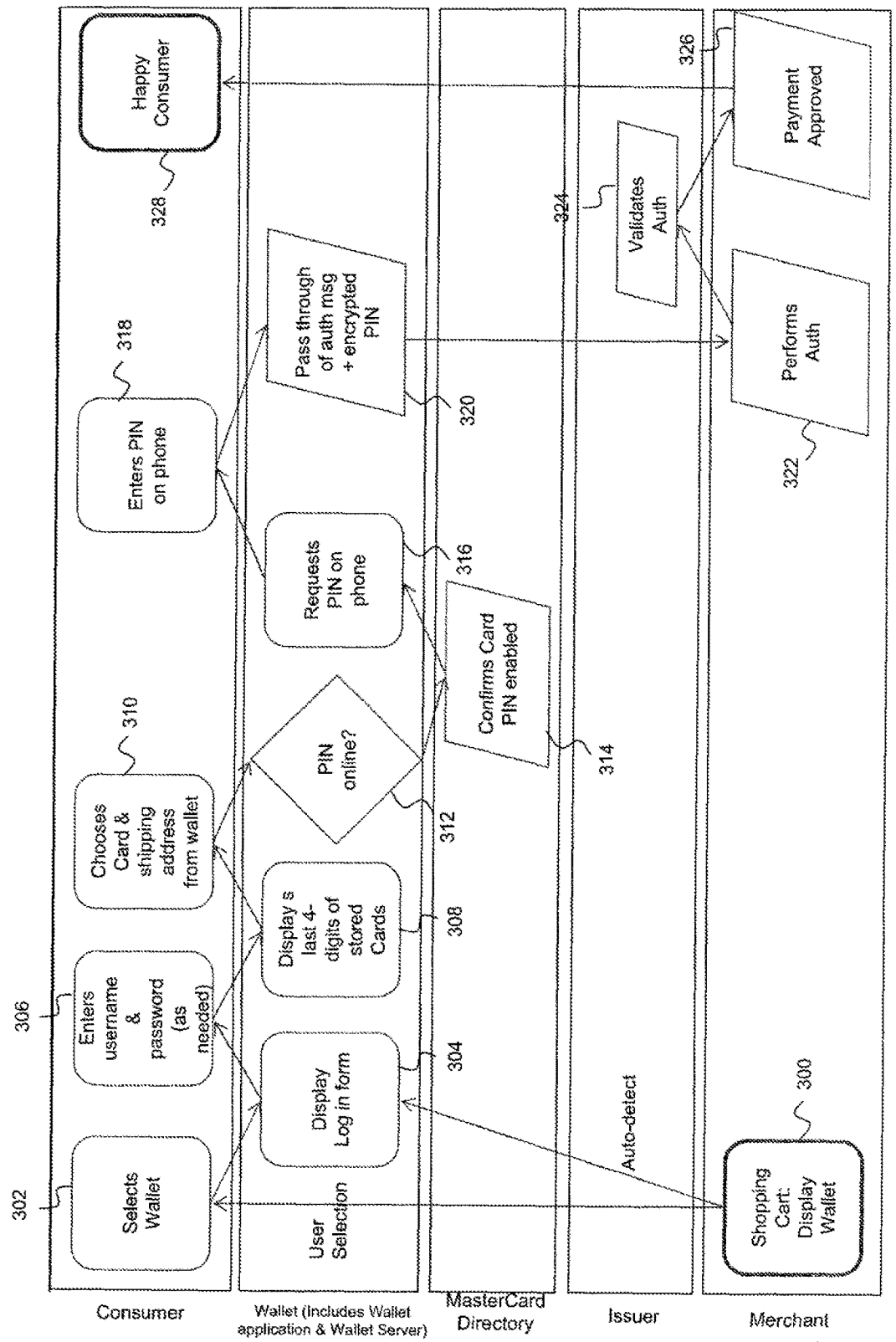
FIG. 4 is a flow chart depicting the wallet application of the present invention being used in an e-commerce transaction originating via a phone, the wallet application utilizing an online PIN for authentication.

FIG. 4 is a flow chart depicting the wallet application of the present invention being used in an e-commerce transaction (e.g., a phone-initiated transaction) with an online PIN. In step 300, the consumer selects the "wallet" icon on the merchant's site. The consumer then selects the wallet application (step 302), which then displays a log in form (step 304). Alternatively, the wallet may be auto-detected. The consumer logs in at step 306, views the listed cards at step 308, and thereafter selects the appropriate payment card and shipping details (step 310). At step 312, the wallet questions whether an online PIN is associated with the card. The existence of the online PIN is confirmed at step 314. In step 316, the wallet requests entry of the online PIN into the phone. The online PIN is entered at step 318. Thereafter, the online PIN is encrypted (step 320), and forwarded to the merchant for authorization (step 322). The transaction is validated at step 324, payment is approved at step 326, resulting in a happy consumer (step 328).

Figure 5:
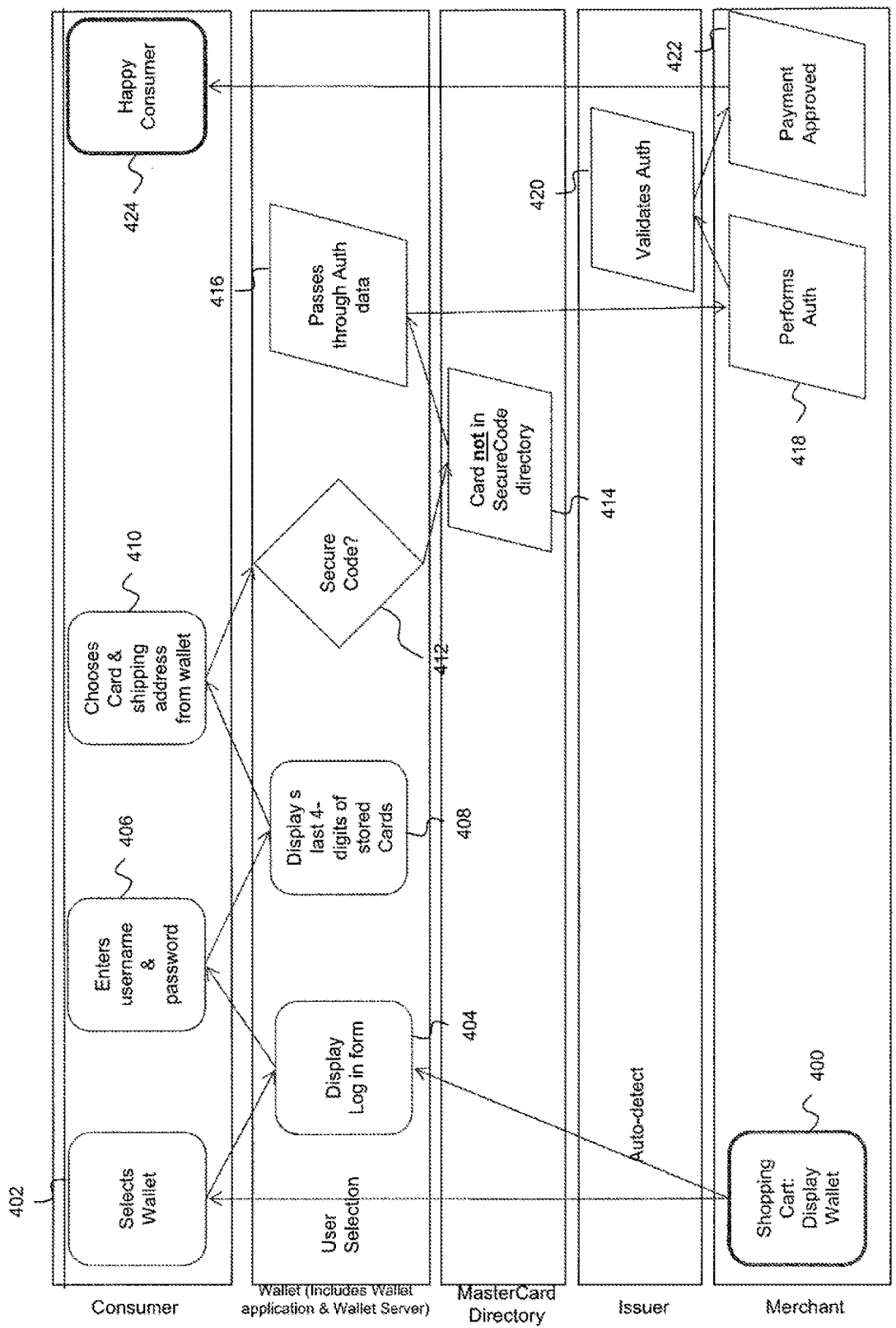
FIG. 5 is a flow chart depicting the wallet application of the present invention being used in an e-commerce transaction originating via a phone, the wallet application not being associated with an offline PIN, a SecureCode PIN and/or online PIN.

FIG. 5 is a flow chart depicting the wallet application of the present invention being used in an e-commerce transaction (e.g., a phone-initiated transaction) without a secure element on the phone, without a SecureCode, and without an online PIN. In step 400, the consumer selects the "wallet" icon on the merchant's site. The consumer then selects the wallet application (step 402), which then displays a log in form (step 404). Alternatively, the wallet may be auto-detected. The consumer logs in at step 406, views the listed cards at step 408, and thereafter selects the appropriate payment card and shipping details (step 410). At step 412, the wallet questions whether a SecureCode is associated with the card. The card is determined not to be in the SecureCode directory at step 414. The authorization data is then passed to the wallet at step 416, which sends such data to the merchant for authorization (step 418). The transaction is validated at step 420, payment is approved at step 422, resulting in a happy consumer (step 424). In this type of scenario, the issuing bank can accept or decline the transaction in accordance with its existing standards. For example, the issuing bank may establish protocols whereby certain e-commerce and/or remote transactions are not approved in the absence of a successful authentication process.

Figure 6:
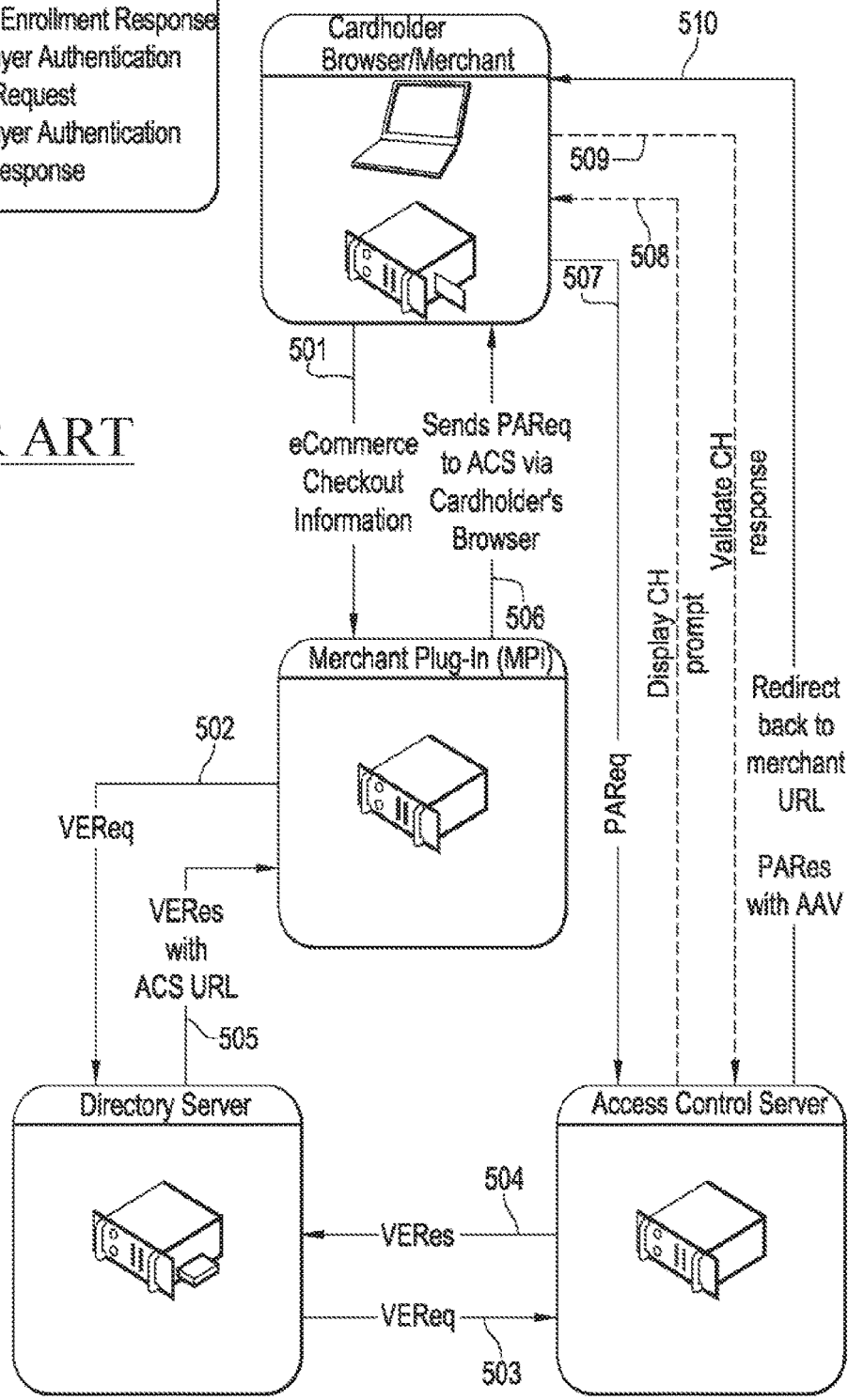
FIG. 6 is a flow chart depicting an existing 3D Secure process.

An existing 3D Secure process is shown in the flow chart of FIG. 6. More particularly, the existing 3D Secure process includes step 501 wherein a merchant initiates an authentication request, and pings the merchant plug-in (MPI) with the cardholder financial instrument information. It should be understood that the cardholder has already accessed the merchant's webpage, and has indicated his desire to purchase a particular product using a particular payment card. In step 502, the MPI identifies the appropriate card type, and sends an authentication request (VEReq) to the relevant directory server. In step 503, the directory server identifies the appropriate access control server (ACS), and requests an authentication response. In step 504, the ACS identifies the card and cardholder, and sends a response (VERes) with authentication prompts within the ACS URL. In step 505, the directory server forwards the authentication response (with the ACS URL) to the MPI. In step 506, the MPI sends the payment authentication request (PAReq) to the merchant for display during checkout. The payment authentication request includes the ACS URL. In step 507, the payment authentication request is sent from the merchant to the ACS—in other words, the merchant calls the ACS URL. In step 508, the ACS sends a pop-up window to the merchant which appears on the cardholder's browser requesting the cardholder to enter authentication credential. In step 509, the cardholder enters the requested authentication credentials, and such information is sent back to the ACS for authentication. In step 510, the ACS validates the authentication credentials, and if correct, sends an AAV confirming authentication to the merchant. Thereafter, the merchant proceeds to authorize the transaction in customary fashion.

One drawback to the process described above with respect to FIG. 6 is that the authentication process requires the use of a pop-up window appearing during the online transaction process. Many online shoppers have been taught to be suspicious of pop-up windows, and are reluctant to enter relevant financial information in such a window for fear that the pop-up window could be coming from a fraudulent website and/or be a part of a phishing scam.

Figure 7:
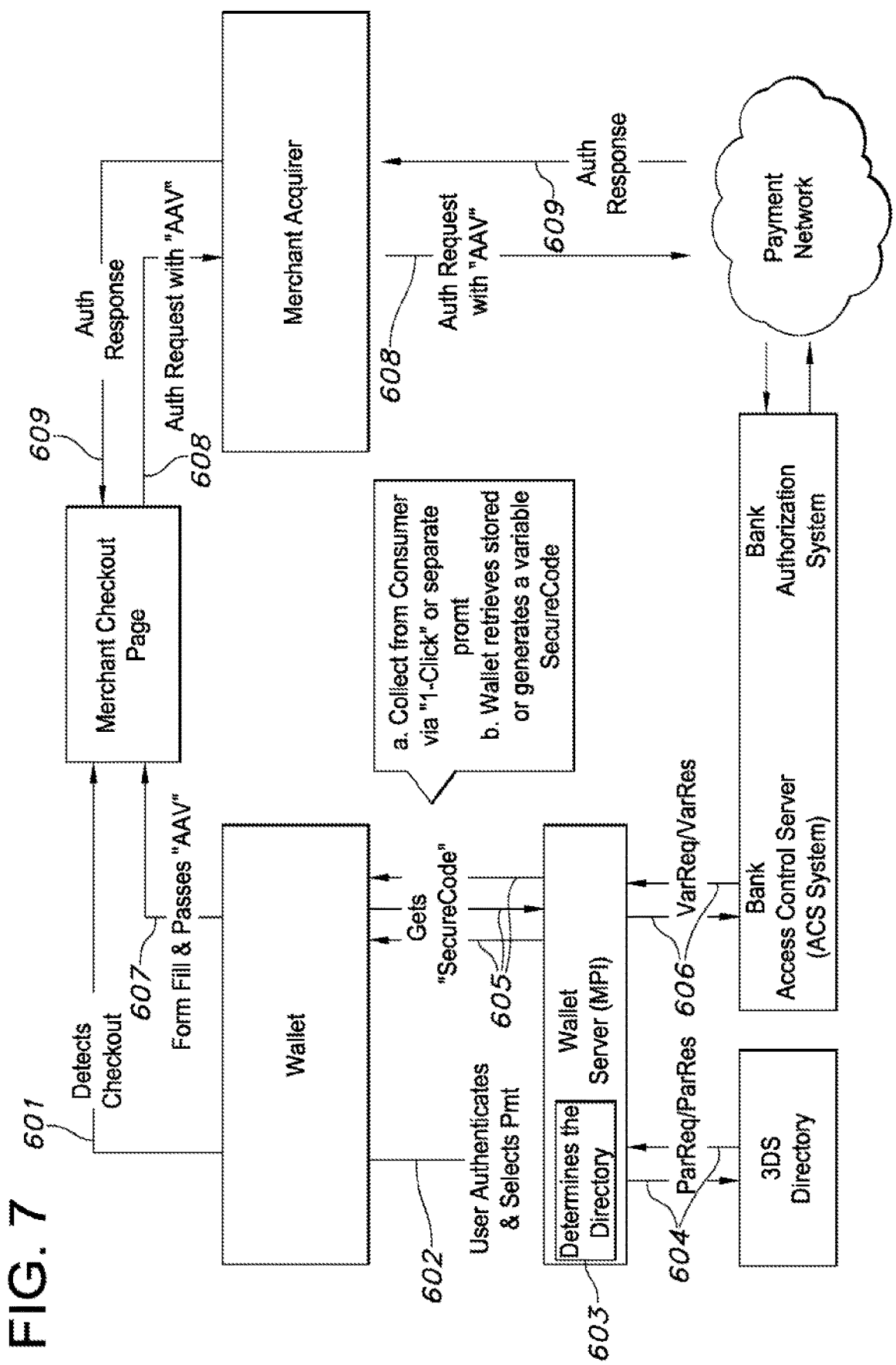
FIG. 7 is a flow chart showing a new authentication process in accordance with the present invention.
Figure 8:
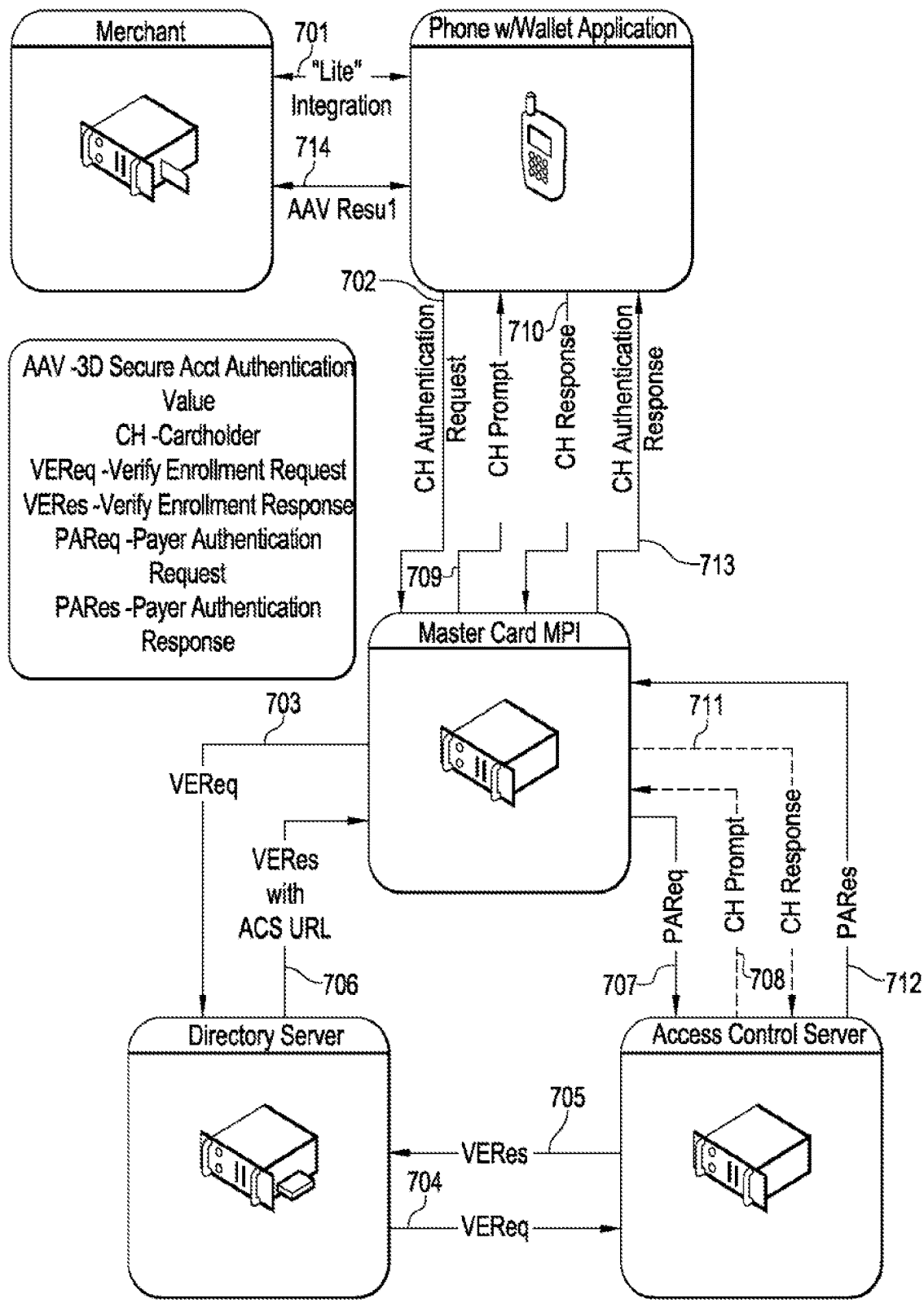
FIG. 8 is a flow chart showing a new authentication process in accordance with the present invention.

The new embodiments of the present invention shown in FIGS. 7 and 8 not only address the drawbacks of relying upon pop-up windows during authentication, but provide the merchant with better control over the checkout experience presented to its customers. These new processes are shown in the context of a phone with a wallet application. However, it is to be understood herein that these processes can also be used in conventional cardholder browser/merchant transactions, i.e., a transaction performed without a phone and/or wallet application.

Turning first to FIG. 7, the wallet detects the checkout page and makes a payment request (step 601). The wallet then authenticates the user, at which point the user can select the payment type (step 602). The wallet server then determines which branded 3DS Directory to use based on the account number selected (step 603). The user's participation is then verified (step 604). Next, the wallet retrieves the SecureCode (step 605). In particular, the user is prompted to enter his/her SecureCode as part of the wallet sign-in or as a separate prompt (step 605a), and/or the wallet retrieves/generates the user's SecureCode which has been securely stored on the phone and wallet server (step 605b), The SecureCode is then sent to the bank for verification (step 606). Next, the wallet form fills the payment details, including the AAV, in the merchant page (step 607). The merchant then authorizes the transaction in normal fashion (step 608), and receives the necessary approval (step 609).

Turning now to FIG. 8, the process includes a step 701 wherein the merchant initiates a transaction request. It should be understood that the merchant has already integrated his existing payment system with the wallet application such that the merchant can receive authentication information from the wallet. In step 702, the wallet initiates an authentication request, and pings the MasterCard Merchant Plug-In (MC-MPI) formed in accordance with the present invention with the cardholder financial instrument information. In step 703, the MC-MPI identifies the appropriate card type, and sends a verify enrollment request (VEReq) to the relevant directory server. In step 704, the directory server identifies the appropriate ACS, and forwards the verify enrollment request (VEReq), expecting a verify enrollment (VERes) response. In step 705, the ACS identifies the card and cardholder, and sends a response (VERes) with the ACS URL. In step 706, the directory server forwards the response (VERes with the ACS URL) to the MC-MPI. At this point, rather than MC-MPI communicating back to the wallet application, the MC-MPI communicates directly with the ACS. More particularly, in step 707, the MC-MPI sends a payer authentication request (PAReq) to the ACS. In other words, the MC-MPI formats the expected request and calls the ACS URL. In step 708, the ACS responds with the traditional browser HTML markup to the MC-MPI. In step 709, the MC-MPI then interprets the HTML markup, including the authenticating criteria, and extracts the needed elements from the HTML markup and translates into the API protocol which is then communicated to the wallet. The wallet then displays an authentication request to the cardholder, requesting that the cardholder enter their authentication credentials. In step 710, the wallet communicates the cardholder authentication credentials to the MC-MPI via API protocol. In step 711, the MC-MPI translates the cardholder authentication credentials into the format expected by the ACS and uses an HTTP POST to communicate the credentials to the ACS. In step 712, the ACS validates the authentication credentials, and sends a payer authentication response (PARes including AAV) back to the MC-MPI representing the authentication result. In step 713, the MC-MPI passes the AAV and information received from the ACS to the wallet via API protocol. In step 714, the wallet passes the AAV and authentication message to the merchant via API protocol. The merchant then proceeds to authorize the transaction in customary fashion.

As described, in step 708 of FIG. 8, the ACS sends the authentication criteria to the MC-MPI for translation. In other words, rather than sending a the HTML markup served by the ACS directly back to the wallet application, the necessary information for authentication is sent to the MC-MPI via the HTML markup, which then can translate that information and forward it in a predetermined manner. More particularly, with respect to a wallet application, such application could be designed to communicate with the MC-MPI in a consistent and known manner whereby a consumer does not receive a "suspicious" pop-up window. Rather, the wallet application can cooperate with the MC-MPI such that every authentication transaction is conducted in a recognized window.

As mentioned hereinabove, the processes described in FIGS. 7 and 8 are also applicable to non-wallet based transactions. More particularly, for browser-based transactions utilizing a 3D Secure process, or other similar process, the forwarding of a pop-up window from the ACS directly back to the merchant can introduce uncertainty into the authentication process. Accordingly, the MC-MPI shown in FIG. 8 could, in another application, communicate directly with a cardholder browser/merchant in the absence of a phone. Such an arrangement could allow the merchant to control how the authentication request appears to the customer during the checkout process. In other words, by sending the authentication criteria through the MC-MPI (where it is translated), the translating information can be sent back to the merchant's webpage in a predetermined and selected manner, thus giving the merchant greater control over the shopping experience of its customers—while also eliminating the usage of pop-up windows.

In another embodiment, the wallet is used as a security supplement. In one application, this is accomplished by authenticating the wallet itself. More particularly, the wallet application is loaded onto the phone, and a payment card is entered into the application. The user's identity is verified, and the wallet thereafter holds the payment data in a secure manner. When the user subsequently uses the wallet to make a purchase, the wallet can communicate to the merchant that the wallet itself has been authenticated, thus decreasing the likelihood of a fraudulent transaction. Referring to FIG. 9A, the SecureCode process can be used to authenticate a wallet. In this regard, the user signs into the wallet and registers a card (step 800). The SecureCode process is initiated for authentication (step 801). The 3DS directory is then accessed at step 802. Next, the user is prompted for the SecureCode (step 803). The SecureCode is verified by the ACS (step 804). If authenticated, the payment card is accepted and stored in the wallet in a secure manner (step 805). Of course, it is contemplated herein that other process could be used to authenticate the wallet, such as an online PIN or a unique wallet PIN/code provided by the issuing bank.

Figure 9B:
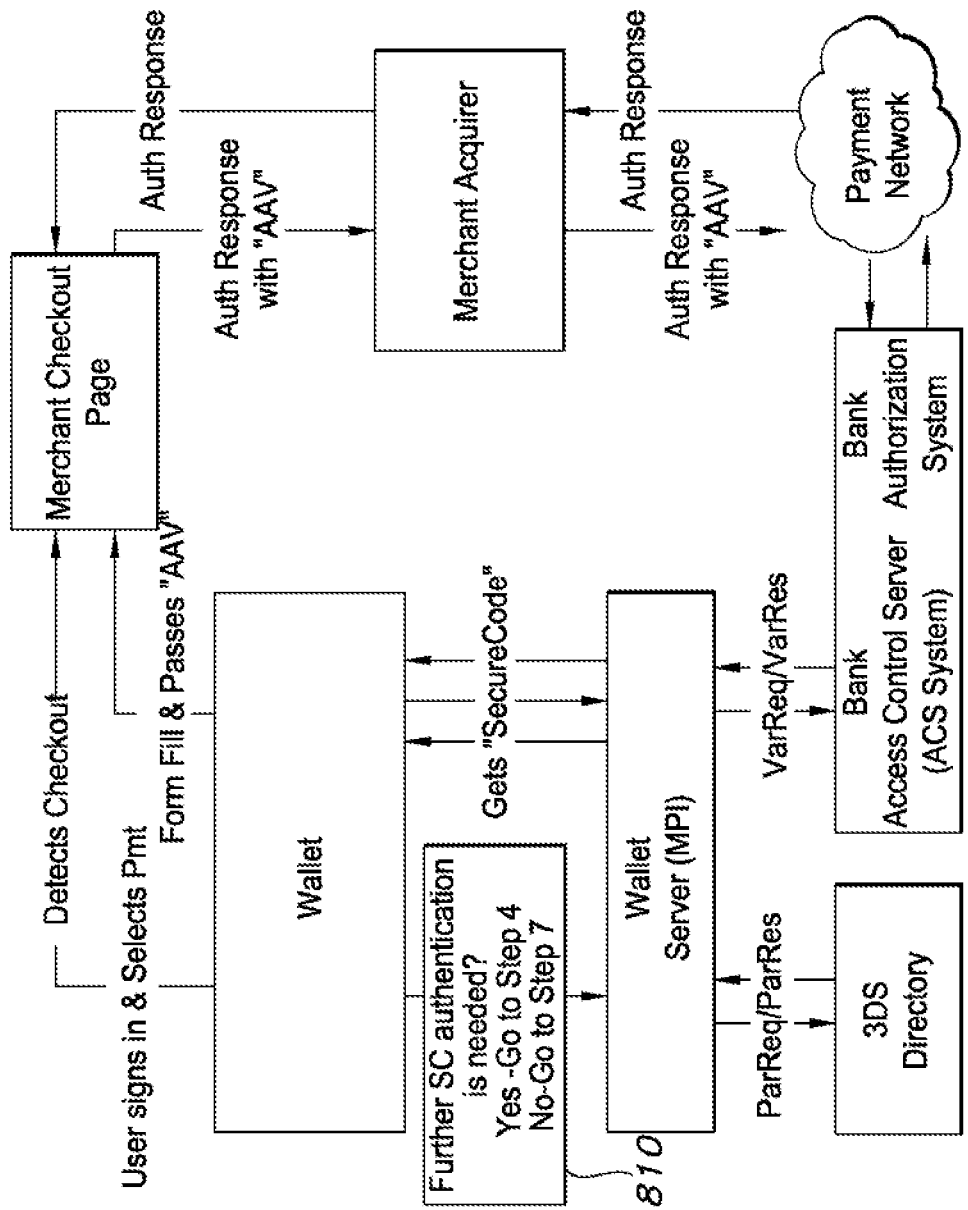
FIG. 9b is a flow chart showing an authenticated wallet application being used for subsequent purchases.

During a future transaction, the wallet can communicate to the merchant that the card has previously been authenticated, thus reducing the likelihood of a fraudulent transaction. Turning now to FIG. 9B, the process shown is similar to that shown in FIG. 7 with the exception of step 810. After the user signs into the wallet, the wallet can determine whether to seek additional authentication from the user. For example, for certain transactions (e.g., a transaction exceeding a particular monetary value, a transaction outside of the user's normal spending habits, etc.) the issuing bank can require authentication beyond the wallet authentication. Thus, if additional authentication is required, the wallet will initiate the SecureCode process. If additional authentication is not required, the wallet will bypass the SecureCode process and proceed with the transaction. Of course, it is contemplated herein that the subsequent authentication process can be other than the SecureCode process, e.g., an online PIN.

Figure 10:
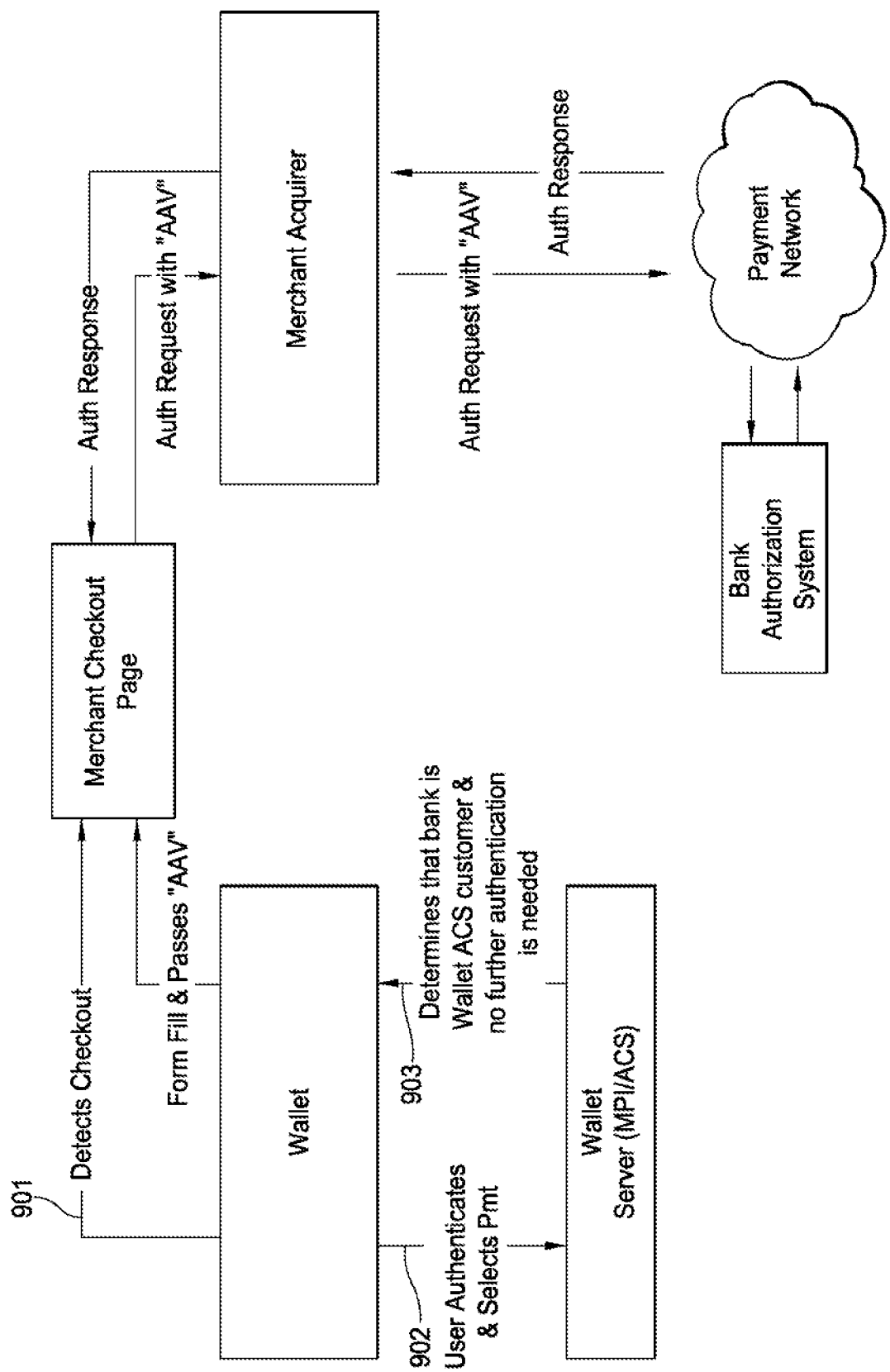
FIG. 10 is a flow chart showing an authentication system wherein the features of the MPI and the ACS has been incorporated into the wallet server.

In another preferred embodiment, a wallet MPI is contemplated wherein the wallet becomes the new SecureCode MPI for merchants. Referring to FIG. 10, the wallet detects checkout at the merchant at step 901. The wallet then authenticates the user (step 902), and payment details are selected (step 902). The wallet server then determines that the bank is the wallet ACS customer, and that no further authentication is necessary (step 803). The remainder of the process is the same as shown in FIG. 7. It is to be noted that the process shown in FIG. 10 does not require the MPI and the ACS shown and described in FIG. 7. Thus, this embodiment may provide a simple way for merchants to deploy the SecureCode process without the need for investment in infrastructure by both the merchant and the issuing bank.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

The invention claimed is:
1. A method of authenticating an identity of a cardholder during a browser-based electronic transaction between the cardholder and a merchant, via a cardholder browser, involving a payment card utilizing 3D Secure protocols, the method being carried-out by a merchant plug-in and comprising the steps of:
 a) sending, by the merchant plug-in, a verify enrollment request to a directory server to identify an access control server suitable for authenticating the electronic transaction;

b) receiving, by the merchant plug-in from the directory server, a verify enrollment response, said verify enrollment response including a URL address of the access control server;

c) sending a payor authentication request from said merchant plug-in to the access control server utilizing said URL address;

d) receiving, by the merchant plug-in, a browser HTML markup from the access control server, the browser HTML markup including authentication criteria for the cardholder and the payment card;

e) extracting, by the merchant plug-in, the authentication criteria from the HTML markup;

f) translating, by the merchant plug-in, the extracted authentication criteria into a protocol compatible with an electronic wallet API associated with an electronic wallet of the cardholder;

g) transmitting, by the merchant plug-in, the translated authentication criteria to the electronic wallet to display an authentication request on the cardholder browser to prompt the cardholder for entry by the cardholder of authentication credentials;

h) receiving, by the merchant plug-in, the authentication credentials from the electronic wallet;

i) translating, by the merchant plug-in, the authentication credentials into a format compatible with the access control server;

j) transmitting, using a HTTP Post command, the translated authentication credentials from the merchant plug-in to the access control server for authentication.

2. The method according to claim 1, wherein the translating the authentication credentials into a form compatible with the access control server includes translating the authentication credentials into HTML markup format.

3. The method according to claim 1, further comprising receiving, by the merchant plug-in, an authentication response from said access control server in response to the transmitting the translated authentication credentials from the merchant plug-in to the access control server for authentication.

* * * * *